United States Patent [19]

Imanishi et al.

[11] Patent Number: 5,678,648
[45] Date of Patent: Oct. 21, 1997

[54] WORKING VEHICLE

[75] Inventors: Ryozo Imanishi; Nobuyuki Yamashita; Hiroyuki Ogasawara; Masaki Hayashi; Katsuhiko Uemura; Eriya Harada, all of Sakai, Japan

[73] Assignee: Kubota Corporation, Osaka, Japan

[21] Appl. No.: 410,520

[22] Filed: Mar. 27, 1995

[30] Foreign Application Priority Data

Nov. 30, 1994 [JP] Japan .................. 6-296083

[51] Int. Cl.[6] ................................ B60K 11/04
[52] U.S. Cl. ........................ 180/68.1; 180/68.4
[58] Field of Search ................ 180/68.1, 68.2, 180/68.4, 68.6, 69.2; 123/41.49, 41.7

[56] References Cited

U.S. PATENT DOCUMENTS

| | | | |
|---|---|---|---|
| 3,987,766 | 10/1976 | Welck | 123/41.66 |
| 4,341,277 | 7/1982 | Adamson et al. | 180/68.1 |
| 4,514,201 | 4/1985 | Brown | 55/385.3 |
| 4,573,544 | 3/1986 | Hoch et al. | 180/68.1 |
| 4,815,550 | 3/1989 | Mather et al. | 180/68.1 |
| 4,862,981 | 9/1989 | Fujikawa et al. | 180/68.4 |
| 4,969,533 | 11/1990 | Holm et al. | 180/273 |
| 5,036,931 | 8/1991 | Iritani | 180/68.4 |
| 5,113,819 | 5/1992 | Murakawa et al. | 180/68.1 |
| 5,207,187 | 5/1993 | Kurohara et al. | 123/41.7 |

FOREIGN PATENT DOCUMENTS 1 490 914   8/1967   France .................. 180/68.1

Primary Examiner—Richard M. Camby
Assistant Examiner—Frank Vanaman
Attorney, Agent, or Firm—Hazel & Thomas

[57] ABSTRACT

A working vehicle according to the present invention has a vertical engine mounted in an engine room covered by a hood, cooling air being drawn from above the engine and exhausted outwardly of a vehicle body through exhaust openings formed in a front surface of the hood. The working vehicle includes a fan disposed above the engine, and dust netting disposed above the fan. The dust netting is substantially box-shaped and includes an overhang portion extending rearwardly of the engine and downwardly.

10 Claims, 3 Drawing Sheets

WORKING VEHICLE

BACKGROUND OF THE INVENTION

1. Field of the Invention

The present invention relates to working vehicles such as riding lawn tractors and other types of tractors, and more particularly to a working vehicle including a vertical engine mounted in an engine room covered by a hood, with a cooling fan disposed above the engine, to draw cooling air from above the engine and blow the cooling air out through exhaust openings formed in a front surface of the hood.

2. Description of the Related Art

In a conventional riding lawn tractor, as disclosed in U.S. Pat. No. 5,207,187, a cooling fan draws engine cooling air through intake openings formed in a control panel, and blows the air to the engine to cool the engine. The cooling air is exhausted through exhaust openings formed in a front surface of a hood and in a muffler cover. The intake openings in the control panel and those in a fan cover have dust nettings for preventing entry of waste straw and other types of dust.

The dust netting provided for the fan cover has a smaller dust-proofing area than that provided for the control panel. Consequently, the dust netting of the fan cover tends to be clogged at an early stage.

In order to eliminate the above inconvenience, it is conceivable to enlarge the fan cover to provide an increased dust-proofing area. However, the fan cover encloses a fan whose size is dependent upon the size of the engine. If only the fan cover were enlarged to increase an intake opening area thereof, a relatively large gap would occur between a locus of revolution of the outer peripheries of the cooling fan and the edge of the intake opening. This would diminish air drawing action of the fan, and allow exhaust air already circulated to cool the engine to leak back through the gap.

SUMMARY OF THE INVENTION

The object of the present invention, therefore, is to inhibit the dust netting of the fan cover from becoming clogged at an early stage, without diminishing the air drawing action of the cooling fan.

The above object is fulfilled, according to the present invention, by a working vehicle having a vertical engine mounted in an engine room covered by a hood, cooling air being drawn from above the engine and exhausted outwardly of a vehicle body through exhaust openings formed in a front surface of the hood, wherein the working vehicle comprises a fan disposed above the engine, and a dust netting disposed above the fan, such that the dust netting is substantially box-shaped and includes an overhang portion extending rearwardly of the engine.

In the working vehicle having the above construction, the cooling fan draws in engine cooling air from above the engine, and blows the cooling air to the engine through the dust netting and a fan cover. Subsequently, the air flows out through the exhaust openings formed in a front surface of the hood and through exhaust openings formed in a muffler cover.

The box-shaped dust netting is disposed above the fan cover, thereby enlarging a dust-proofing area for the fan cover. The dust-proofing area is further enlarged by the dust netting extending rearwardly of the engine, with the overhang portion bulging downward.

The working vehicle may include a radiator if the engine is water-cooled. In the case of a water-cooled engine, the invention inhibits the dust netting for the radiator from becoming clogged at an early stage.

As noted above, early clogging of the dust netting of the fan cover is inhibited, which reduces the frequency at which dust clogging the dust netting must be removed. This allows the working vehicle to engage in an extended operation, thereby realizing improved operating efficiency.

Other features and advantages of the invention will be apparent from the following description of the embodiments.

DETAILED DESCRIPTION OF THE PREFERRED EMBODIMENT

Figure 1:
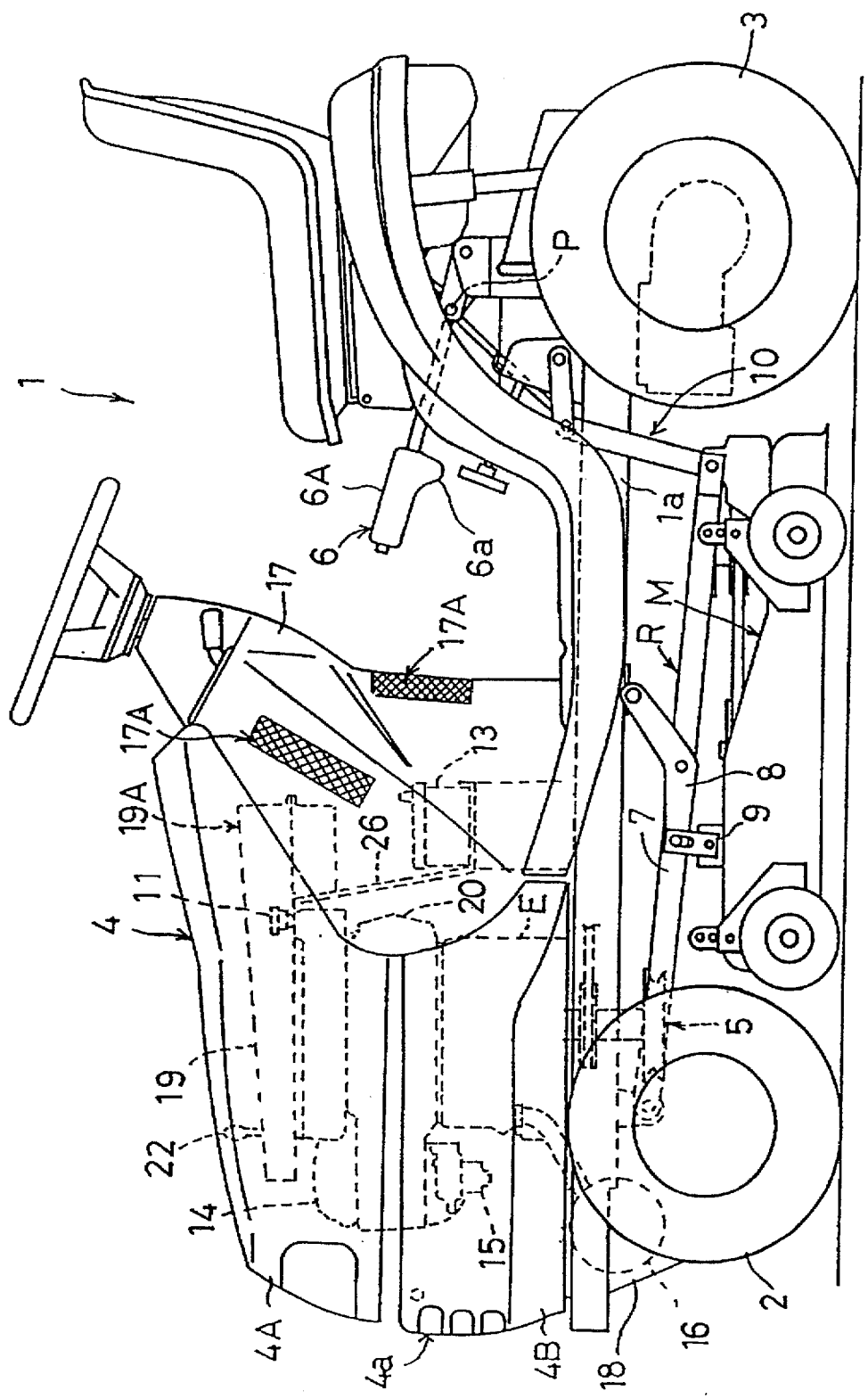
FIG. 1 is a side elevation of a riding lawn tractor.

FIG. 1 shows a mid-mount type riding lawn tractor including a tractor body 1 having a mower unit M suspended between front wheels 2 and rear wheels 3. The tractor body 1 carries a vertical engine E mounted on a front position thereof and covered by an engine hood 4. Drive is transmitted from the engine E to the mower unit M through a belt transmission 5.

The mower unit M is vertically, movably connected to body frames 1a through a link mechanism R raised and lowered by operating a hand lever 6. The hand lever 6 includes a grip 6A having an antislip projection 6a extending radially therefrom.

The link mechanism R includes elongate links 7 connected at forward ends thereof to the tractor body 1 and extending longitudinally of the tractor body 1, seesaw arms 8 connected to intermediate positions of the elongate links 7, and connecting links 9 connecting the seesaw arms 8 to the mower unit M. The link mechanism R is controllable by the hand lever 6 pivotable about a pivotal axis P. Rear ends of the elongate links 7 are connected to links 10 to be vertically movable relative to the tractor body 1.

Figure 2:
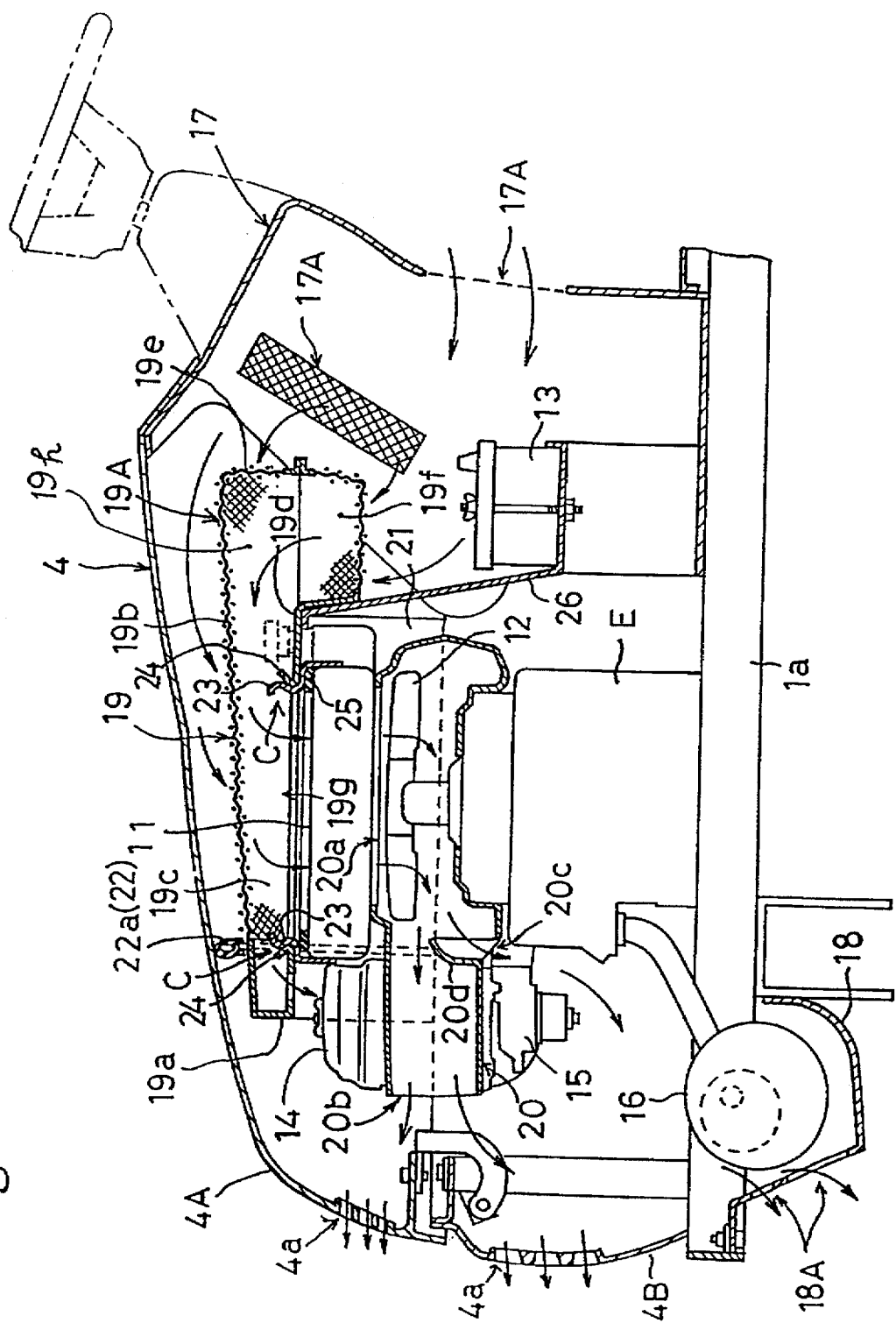
FIG. 2 is a sectional side view of a front portion of the lawn tractor.

Referring to FIG. 2, the engine hood 4 houses a horizontal radiator 11 disposed in an upper position, and the vertical engine E which is water-cooled and has a radiator cooling fan 12. A battery 13 is mounted rearward of the engine E, while an air cleaner 14, a carburetor 15 and a muffler 16 are arranged forward of the engine E. The radiator cooling fan 12 draws engine cooling air through intake openings 17A of a rear grille and side grilles formed in a control panel 17 defining a rear wall of the engine room. The air, after cooling the radiator 11, engine E and carburetor 15, is blown out through exhaust openings 4a in a front surface of the hood 4 and exhaust openings 18A formed in a muffler cover 18.

A box-shaped dust netting (or dust casing) 19 is disposed above the radiator 11. The box-shaped dust netting 19 extends rearwardly relative to the engine E, with an overhang portion 19A bulging downward.

Figure 4:
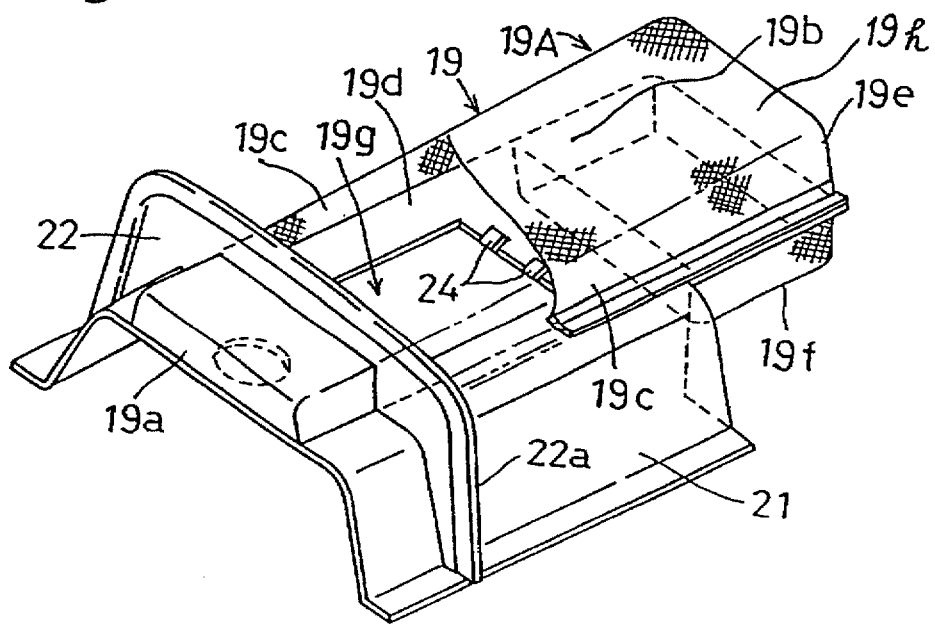
FIG. 4 is a perspective view of dust netting.

As shown in FIGS. 2 and 4, the dust netting 19 is a hexahedron having a front surface 19a, an upper surface 19b, opposite side surfaces 19c, a lower surface 19d and a rear surface 19e. The dust netting 19 partly extends rearwardly of the engine E, with the overhang portion 19A including a downward bulge 19f.

Figure 3:
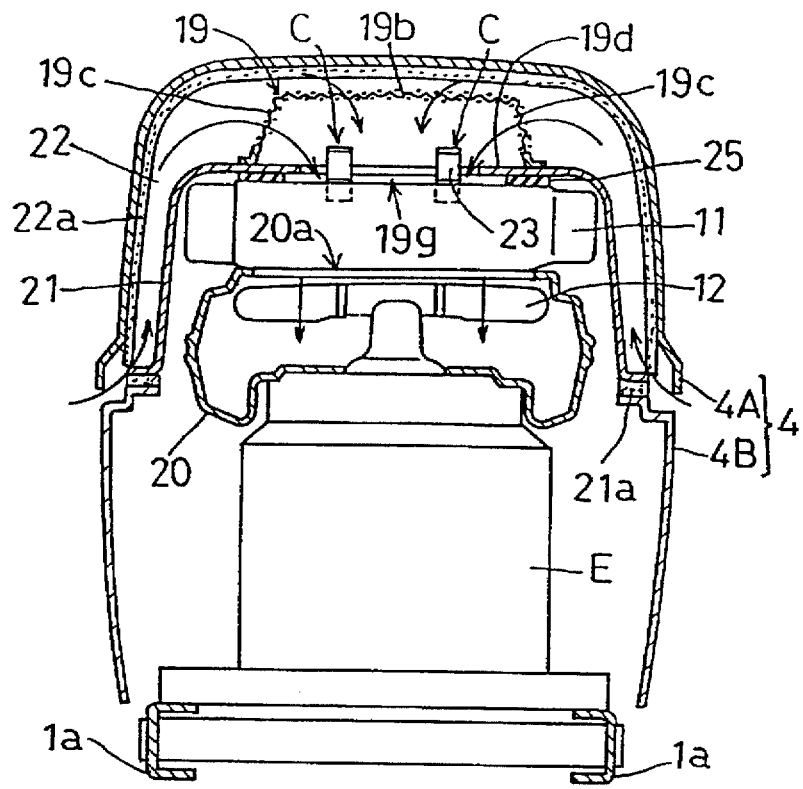
FIG. 3 is a sectional front view a of the front portion of the lawn tractor.

Specifically, the overhang portion 19A includes a horizontal overhang portion 19h extending rearwardly of the engine E parallel to an upper surface of the radiator 11, and the downward bulge 19f extending downward from the horizontal overhang portion 19h. An intermediate portion of the lower surface of the dust netting 19 is connected to a flat plate 19d. The flat plate 19d defines an opening 19g centrally thereof. Engine cooling air is drawn through the upper surface 19b, opposite side surfaces 19c, rear surface 19e and bulge 19f. A first shield 21 is connected to each of the opposite side surfaces 19c for covering the radiator 11 and a fan cover 20. A second shield 22 straddles, and is fixedly connected to, an upper forward surface of the dust netting 19. Seals 21a and 22a are fixed to lower ends of the first shields 21 and an outer edge of the second shield 22, respectively. FIGS. 3 and 4 show the flat plate 19d and first shield 21 formed integrally, but these components may be formed separately. The first shields 21 and second shield 22 constitute a shield assembly.

The box-shaped dust netting 19 is connected, through an engaging device C (FIGS. 3 and 4), to the radiator 11 fixed to an upper surface of the fan cover 20.

The engaging device C includes elastic engaging pieces 23 formed of plate springs and arranged in front and rear, and right and left positions of the radiator 11, and engageable pieces 24 formed by bending edges of the opening 19g in the flat plate 19d at the bottom of the dust netting 19. The engaging pieces 23 are pressed downward into engagement with the engageable pieces 24. As a modified engaging device C, the radiator 11 may include elastic engaging pieces formed in front and rear positions thereof for engaging inner peripheral edges of the opening 19g in the flat plate 19d. Further, cushion elements 25 are arranged between the dust netting 19 and for radiator 11 for preventing entry of hot air and suppressing noise. It is preferable to arrange the cushion elements 25 over the entire circumference of the radiator 11 particularly for preventing entry of hot air.

The fan cover 20 is a box-shaped cover defining an intake opening 20a in the upper surface, an exhaust opening 20b in the front surface, and an exhaust opening 20c in the lower surface thereof. The lower surface includes a scoop 20d (FIG. 2) for guiding engine cooling air to the exhaust opening 20c.

A heat shielding plate 26 is provided between the fan cover 20 and battery 13 in the longitudinal direction of the vehicle, for guiding engine cooling air drawn in through the intake openings 17A formed in the control panel 17, to the bulge (or downward overhang portion) 19f of the dust netting 19.

As shown in FIG. 3, engine cooling air may be drawn in also through gaps between an upper hood 4A and a lower hood 4B.

According to the above construction, the cooling fan 12 draws engine cooling air through the intake openings 17A formed in the control panel 17 and the gaps between the upper hood 4A and lower hood 4B. The air, stripped of dust by the dust netting 19, cools the radiator 11, flows downward and forward through the fan cover 20, and flows out through the exhaust openings 4a in the front surface of the hood 4 and the exhaust openings 18A in the muffler cover 18.

Dust netting is provided on a lower surface of the overhang portion 19A of the dust netting 19. Dust such as waste straw adhering to the lower surface of the bulge 19f falls when the engine stops or idles. Further, the overhang portion 19A, with the horizontal overhang portion 19h and downward overhang portion 19f, has an increased surface area. As seen from FIG. 2, the overhang portion 19A is disposed adjacent the intake openings 17A in the control panel 17. The portion having the largest netting surface area is disposed adjacent the intake openings 17A, and the heat shielding plate 26 acts to guide the cooling air drawn in, to the overhang portion 19A. Thus, a large part of the cooling air drawn in through the intake openings 17A may pass through the overhang portion 19A of the dust netting 19. As a result, dust tends to adhere in large quantities to the overhang portion 19A. The dust adhering to the lower surface of this portion falls when the engine stops or idles, as noted above. This features provides the effect of inhibiting the dust netting 19 from becoming clogged at an early stage. The dust netting 19 formed integral with the first shields 21 and second shield 22 intercepts heat radiating from the radiator 11 and engine E. Further, the air intake results in air flows between the first shields 21 and inner walls of the upper hood 4A to produce a cooling effect.

In the foregoing embodiment, engine cooling air is drawn in through the intake openings formed in the control panel. Such intake openings may be formed in an upper surface of the hood to draw air from above the hood.

The lower surface of the overhang portion of the dust netting is depicted to extend substantially horizontally. However, this lower surface may be slightly inclined.

The present invention is applicable to a working vehicle driven by an air-cooled engine without a radiator.

The working vehicles to which the present invention is applicable include tractors other than the riding lawn tractor.

What is claimed is:

1. A working vehicle having a vertical engine mounted in an engine room covered by a hood, cooling air being drawn from above the engine and exhausted outwardly of a vehicle body through exhaust openings formed in a front surface of the hood, said working vehicle comprising:

a radiator mounted above the engine:

a fan operatively connected to the engine and positioned between said engine and said radiator for cooling said radiator; and dust netting mounted above said fan, wherein said dust netting is substantially box-shaped and includes an overhang portion extending rearwardly of said engine and a shield assembly plate fixed to a lower surface of said dust netting, said shield assembly plate having defined therein an opening for guiding the cooling air to said engine, and said radiator includes means for engaging with said opening in said shield assembly plate, whereby said dust netting is fixed to said radiator.

2. A working vehicle as defined in claim 1, wherein said overhang portion includes a horizontal overhang portion extending rearwardly of a rear end of said engine parallel to an upper surface of said radiator, and a lower overhang portion extending downward from said horizontal overhang portion.

3. A working vehicle as defined in claim 2, wherein said overhang portion and said lower overhang portion are formed integral with each other.

4. A working vehicle as defined in claim 3, wherein said lower overhang portion has a substantially horizontal lower surface.

5. A working vehicle as defined in claim 1, wherein said shield assembly includes first shields extending sideways relative to said vehicle body to cover a region above said engine, and a second shield extending transversely of said vehicle body along an inner surface of said hood in a position forward of said opening relative to said vehicle body so as to straddle said dust netting.

6. A working vehicle as defined in claim 1, further comprising elastic elements fixedly connected between said shield assembly and said radiator for preventing entry of hot air and for suppressing noise.

7. A working vehicle having a vertical engine mounted in an engine room covered by a hood, cooling air being drawn from above the engine and exhausted outwardly of a vehicle body through exhaust openings formed in a front surface of the hood, said working vehicle comprising:

a radiator mounted above the engine;

a fan operatively connected to the engine and positioned between said engine and said radiator for cooling said radiator;

dust netting mounted above said fan for covering said fan against dust; and control panel rearward of said engine relative to said vehicle body, said control panel defining a rear wall of the engine room and having defined thereon intake openings through which cooling air is drawn, wherein said dust netting is substantially box-shaped and includes an overhang portion, said overhang portion including a horizontal overhang portion extending rearward of of said engine relative to said vehicle body and parallel to an upper surface of said radiator, and a lower overhang portion extending downward from said horizontal overhang portion, said lower overhang portion being positioned adjacent said intake openings of said control panel.

8. A working vehicle as defined in claim 7, further comprising a shielding plate for intercepting heat radiating from said radiator and said engine, said shield plate being disposed rearward of said engine and forward of said overhang portion relative to said vehicle body for guiding cooling air drawn in through said intake openings to said overhang portion.

9. A working vehicle as defined in claim 8, wherein part of the cooling air drawn in through said intake openings is guided along said shielding plate to said overhang portion, and flows through said dust netting and said fan to be exhausted out of said vehicle body through said exhaust opening formed forwardly of said hood.

10. A working vehicle as defined in claim 7, wherein at least one of said intake openings is located on said control panel lower than a lowermost portion of said lower overhang portion.

* * * * *